May 29, 1928.
W. E. TRUMPLER
1,671,496
REDUCTION GEAR
Filed Dec. 2, 1922
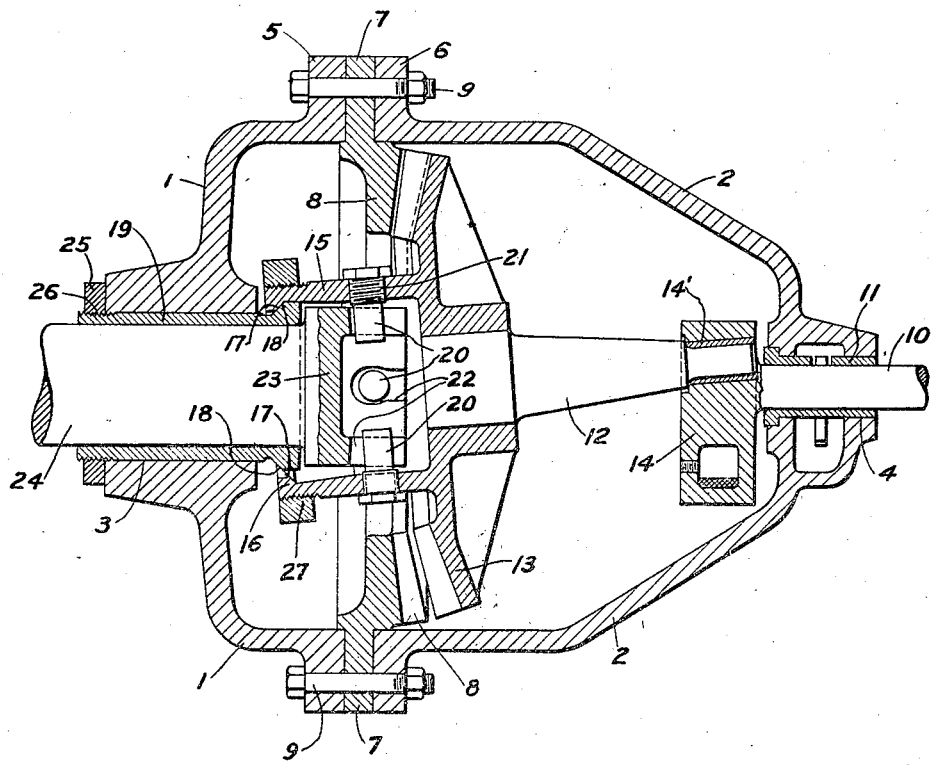
WITNESSES:
INVENTOR
William E. Trumpler
BY
ATTORNEY Patented May 29, 1928.

1,671,496

UNITED STATES PATENT OFFICE.

WILLIAM E. TRUMPLER, OF SWISSVALE, PENNSYLVANIA, ASSIGNOR TO WESTINGHOUSE ELECTRIC & MANUFACTURING COMPANY, A CORPORATION OF PENNSYLVANIA.

REDUCTION GEAR.

Application filed December 2, 1922. Serial No. 604,501.

This invention relates to reduction gearing, more especially to an improved structure of a gear mechanism capable of providing high ratios of reduction of speeds.

A type of reduction gearing consisting essentially of a stationary gear and an angularly mounted or "wabble" gear meshing therewith, said angular gear having a different number of teeth than the stationary gear, is well known. Such a device is capable of affording a high ratio of reduction of speeds but considerable difficulty has been encountered in that the life of the device was short, owing to the destruction caused by vibration induced by the wabbling motion of the angularly mounted gear in the structure.

The present invention is designed to obviate the difficulties encountered in reduction gearing of the above-specified type, it being among the objects thereof to provide a reduction gearing which shall be relatively simple in construction, which shall embody means for eliminating vibration and which shall avoid the imposition of end thrusts upon either the driving or the driven member.

In practising my invention, I provide a stationary gear mounted in a casing and a "wabble" or angularly mounted gear on a circularly swinging shaft which is rotated by an eccentric bearing located on the driving shaft. The "wabble" gear meshes with the stationary gear in such a manner as to roll on said gear. The angularly mounted gear is secured to the driven shaft by a trunnion structure which is so designed that no end or radial thrust is imposed thereby upon the driven shaft. The end thrust, which normally results from the tooth pressure of the stationary gear on the eccentrical gear, is absorbed by a specially constructed thrust bearing. Suitable adjustable means are provided for balancing the dynamic forces of the swinging shaft to minimize vibration therein.

In the accompanying drawing constituting a part hereof and in which like reference characters designate like parts, the single figure is a vertical cross-sectional view of a reduction gearing embodying my invention.

The casing consists of two parts 1 and 2 having journal boxes 3 and 4, respectively, at the outer ends thereof, and flanges 5 and 6, respectively, in opposed relation at their inner ends. Clamped between said flanges is the flange 7 of a stationary bevel gear 8 which is held in position by a series of bolts 9, or the like.

A shaft 10 constituting the driving member, the motion of which is to be transmitted at a reduced rate of rotation, is fitted into bearing 11 in journal box 4. A swinging shaft 12 carries, on the outer end thereof, an angularly mounted bevel gear 13 having, preferably, one or two teeth less than the gear 8 and meshing therewith. The shaft 10 is provided at its inner end with a crank 14 which also constitutes an adjustable balancing weight. A crank bearing 14' in the crank 14 provides a recess for receiving the end of the swinging shaft 12.

A sleeve 15, having an inwardly projecting flange 16 and a thrust face 17, projects from the opposite side of gear 13, said thrust face 17 making contact with a corresponding thrust face 18 on bearing 19 in journal box 3. A series of pins 20, equally spaced on the periphery of sleeve 15 and held therein by threaded portions 21, or otherwise, project inwardly and engage slightly elliptical slots 22 in the slotted end 23 of the driven shaft 24. A nut 25, on a screw-threaded portion 26 of bearing 19, may be moved inwardly or outwardly to adjust the bearing 19 so that thrust faces 17 and 18 are in the proper relationship to maintain normal engagement of the faces of the gear wheels 8 and 13.

A balancing ring or weight 27 is screwed on the outer surface of the sleeve 15 in such manner that it may be adjusted longitudinally thereof without disturbing its concentric relationship with the swinging shaft 12. The purpose of the balancing ring 27 is to provide means for adjusting the mass of the oscillatory member comprising the shaft 12, the bevel gear 13 and the sleeve 15 along the axis of the shaft 12 to exactly locate the mutual centers of percussion thereof at the pivot center and at the center of the bearing 14' respectively; the pivot center being the point defined by the intersection of the axis of the shafts 12 and 24. A concentric ring is used for this purpose to avoid disturbing the dynamic balance of the oscillatory member about its own axis.

When the proper mass distribution is attained, it follows that, with one percussion point held stationary at the pivot center, the resultant of the dynamic forces produced by swinging the oscillatory member will be exerted radially against the weight 14 in the plane of rotation of the second percussion point, which is at the center of the bearing 14'. This force may then be counterbalanced by properly adjusting the balancing weight 14.

This adjustable feature allows each reduction-gear unit to be individually adjusted, by the cut-and-try method, to a perfect dynamic or running balance.

The operation of the device is briefly as follows: The shaft 10, when rotated, produces an oscillatory motion of the shaft 12 about its pivot point in the trunnion member 23. This movement of the shaft 12 causes a corresponding motion of the gear wheel 13 and, owing to the differences in the number of teeth of the gear wheels 8 and 13, the gear wheel 13 will be retarded a number of teeth equal to this difference for each revolution of the shaft 10. This motion is transmitted through the pins 20 and the slots 22 to the trunnion 23 and to the driven shaft 24, causing it to rotate.

Because of the trunnion joint between the shaft 24 and the shaft 12, there is practically no resultant end thrust exerted upon the shaft 24.

Although I have described a specific embodiment of my invention, it will be obvious to those skilled in the art that various modifications may be made in the details of construction and in the design and proportions of the several co-operating parts without departing from the principles of my invention as set forth in the appended claims.

I claim as my invention:

1. A reduction-gear system including a driving shaft, a driven shaft, a stationary gear, an angularly mounted gear having a different number of teeth meshing therewith and connected in swinging relation to one of said shafts, means for operatively connecting said angularly mounted gear with said second shaft and balancing means for said angularly mounted gear for shifting its center of gravity.

2. A reduction-gear system including a driving shaft, a driven shaft, a stationary gear, an angularly mounted gear having a different number of teeth meshing therewith and connected in swinging relation to one of said shafts, means for operatively connecting said angularly mounted gear with said second shaft and means for shifting the center of gravity of said angularly mounted gear.

3. A reduction-gear system including a driving shaft, a driven shaft, a stationary gear, an angularly mounted gear having a different number of teeth meshing therewith and connected in swinging relation to one of said shafts, means for operatively connecting said angularly mounted gear with said second shaft and means for dynamically balancing said angularly mounted gear by shifting its center of gravity.

4. A reduction gear system including a driving shaft, a driven shaft, a stationary gear wheel, an angularly mounted gear wheel having a different number of teeth meshing therewith and adapted to be swingingly connected to the driving shaft, means for operatively connecting said angularly mounted gear wheel with said driven shaft, and means for adjusting the center of gravity of said angularly mounted gear wheel along its axis.

5. In a mechanical movement, the combination with a driving and a driven shaft in axial alinement, of an oscillating shaft having a gear wheel secured thereto, a stationary gear wheel for cooperating therewith, a crank on said driving shaft for engaging one end of said oscillating shaft, means for pivotally connecting said oscillating shaft to said driven shaft and means for shifting the center of gravity of said oscillating shaft.

6. In a mechanical movement, the combination with a driving and a driven shaft in axial alinement, of an oscillating shaft having a gear wheel secured thereto, a stationary gear wheel for cooperating therewith, a crank on said driving shaft for engaging one end of said oscillating shaft, means for pivotally connecting said oscillating shaft to said driven shaft and means for adjusting the center of gravity of said oscillating shaft along its axis of rotation.

7. In a mechanical movement, the combination with a driving and a driven shaft in axial alinement, of an oscillating shaft having a gear wheel secured thereto, a stationary gear wheel for cooperating therewith, a crank on said driving shaft for engaging one end of said oscillating shaft, means for pivotally connecting said oscillating shaft to said driven shaft and means for adjusting the mass distribution of said oscillating shaft to locate mutual centers of percussion at the pivotal connection and at the end of the shaft that is engaged by the crank.

8. In a mechanical movement, the combination with a driving and a driven shaft in axial alinement, of an oscillating shaft having a gear wheel secured thereto, a stationary gear wheel for cooperating therewith, a crank on said driving shaft for engaging one end of said oscillating shaft, means for pivotally connecting said oscillating shaft to said driven shaft, means for adjusting the mass distribution of said oscillating shaft to locate mutual centers of percussion at the pivotal connection and at the end of the shaft that is engaged by the crank and means for counterbalancing said crank.

9. In a mechanical movement, a driving shaft having a crank thereon, a driven shaft in axial alignment therewith, an oscillating shaft having one end pivoted to the driven shaft and the other end in engagement with the crank, a gear wheel secured to the oscillating shaft, a stationary gear wheel for cooperating therewith and means for balancing said oscillating shaft to locate mutual percussion points thereof in the pivoted end and in the crank end.

10. In a mechanical movement, a driving shaft having a crank thereon, a driven shaft in axial alignment therewith, an oscillating shaft having one end pivoted to the driven shaft and the other end in engagement with the crank, a gear wheel secured to the oscillating shaft, a stationary gear wheel for cooperating therewith, means for balancing said oscillating shaft to locate mutual percussion points thereof in the pivoted end and in the crank end and means for counterbalancing the crank.

11. The method of dynamically balancing a wobble-gear-reduction system which comprises so distributing the mass of the oscillatory member that a single radial force acting in a plane of rotation of the crank will reduce the sum of the moments about the pivot point and the sum of the radial force to zero and counterbalancing this force in the same plane of the crank.

12. The method of dynamically balancing a wobble-gear-reduction system which comprises adjusting the mass of the oscillatory member in such manner that one center of percussion lies at the pivot point and the other lies within the plane of rotation of the crank and counterbalancing the crank to overcome the resultant of the centrifugal forces of the oscillatory member and the crank.

In testimony whereof, I have hereunto subscribed my name this 13th day of November, 1922.

WILLIAM E. TRUMPLER.